Figure 1:
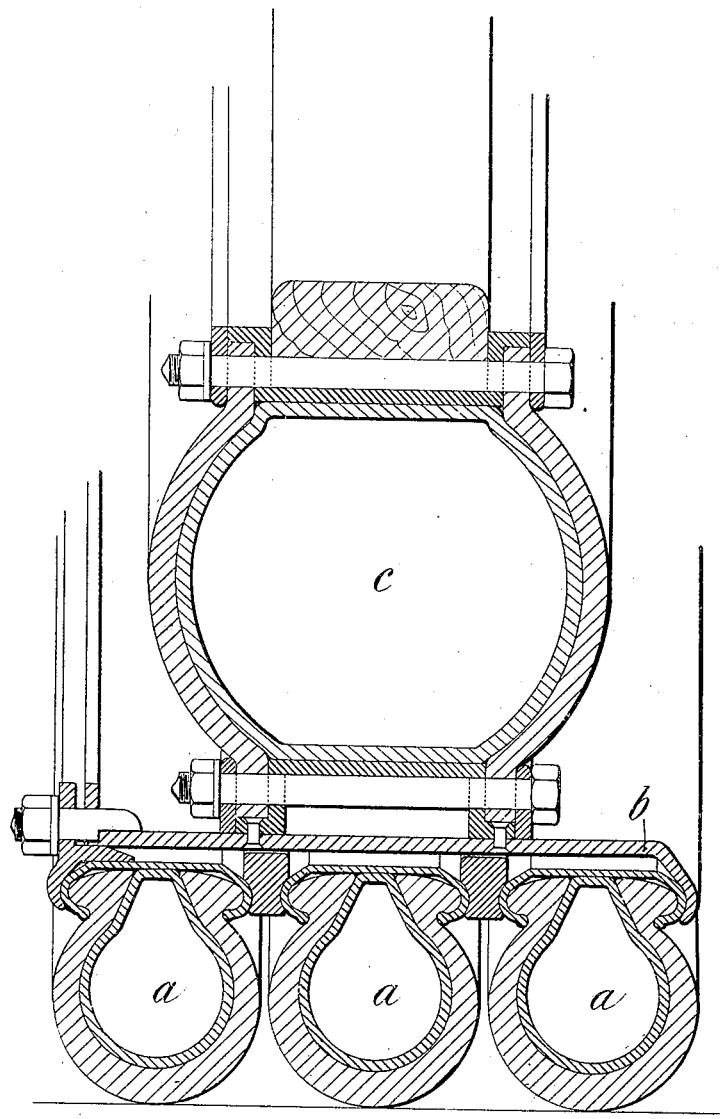

E. E. MICHELIN.
WHEEL FOR VEHICLES.
APPLICATION FILED JAN. 27, 1909.

920,603.

Patented May 4, 1909.
2 SHEETS—SHEET 1.

E. E. MICHELIN.
WHEEL FOR VEHICLES.
APPLICATION FILED JAN. 27, 1909.
920,603.
Patented May 4, 1909.
2 SHEETS—SHEET 2.
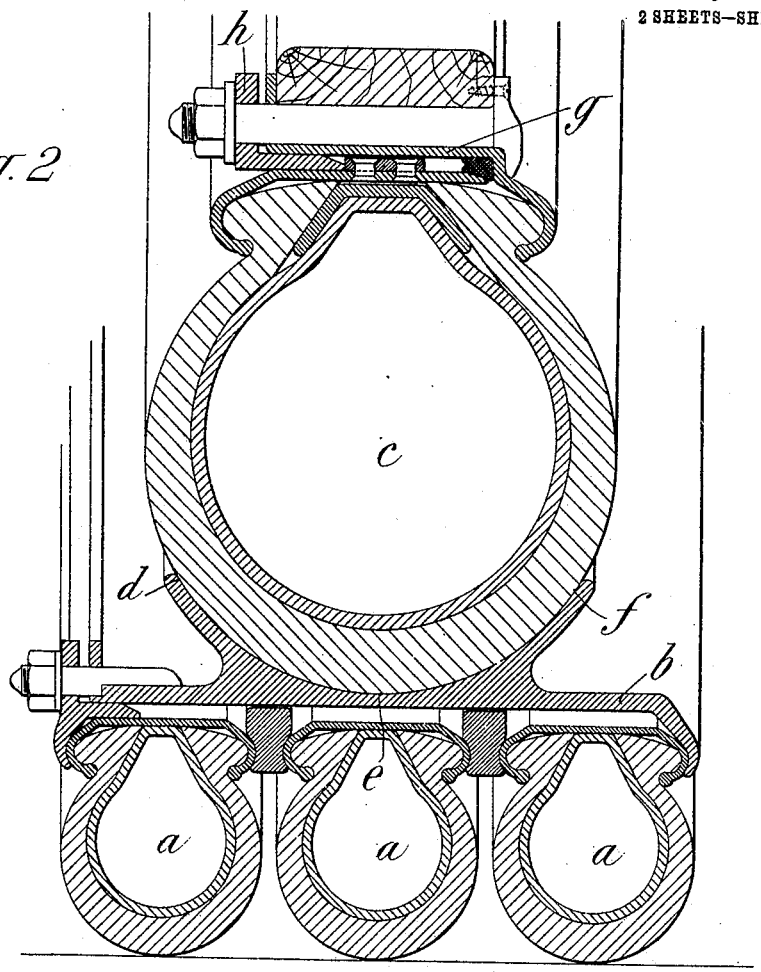
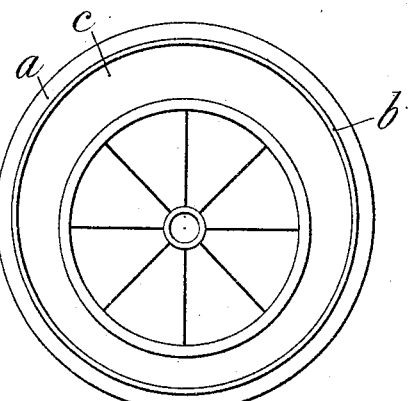

UNITED STATES PATENT OFFICE.

EDOUARD ETIENNE MICHELIN, OF CLERMONT-FERRAND, FRANCE.

WHEEL FOR VEHICLES.

No. 920,603.          Specification of Letters Patent.          Patented May 4, 1909.

Application filed January 27, 1909. Serial No. 474,577.

*To all whom it may concern:*

Be it known that I, EDOUARD ETIENNE MICHELIN, citizen of the Republic of France, and resident of Rue du Nord, Clermont-Ferrand, Puy-de-Dôme, in the said Republic, manufacturer, have invented new and useful Improvements in Wheels for Vehicles, of which the following is a specification.

It is impossible to employ ordinary wheels with several pneumatic tires for very heavy vehicles, because the total width of surface bearing on the road being considerable, it follows that the tires bear unequally owing to the camber of the road; and moreover if one of the tires encounters a small obstacle the others are lifted more or less from contact with the road. For these reasons one of the tires may be subjected to a load far in excess of that for which it is constructed and the tires are thus liable to wear out quickly. Moreover heavy vehicles when passing over culverts and the like are subject to shocks of considerable magnitude which wear out tires of small width by causing them to pass the limit of their elasticity. According to this invention these difficulties are avoided by supporting the rim carrying the multiple tires by a large pneumatic tire or cushion owing to which the outer rim may assume a considerable inclination to the axle of the wheel and can thus conform to the camber of the road. The cushion also relieves the tires in contact with the road by yielding and absorbing the large oscillations referred to.

Figures 1 and 2 of the drawings are cross sections of parts of wheels made according to this invention and Fig. 3 is a side elevation of a complete wheel.

$a$ indicates the multiple pneumatic tires, three for example, detachably secured to the rim $b$; $c$ is a large pneumatic tire interposed between the rim and the wheel and formed with two half covers which can be readily detached as shown in Fig. 1, or as shown at Fig. 2, it may be a tire of usual form on which the rim $b$ is mounted before inflation and which on inflation holds this rim by fitting into a circular channel $d$ $e$ $f$ thereon.

The cushion $c$ may if preferred be carried by a detachable rim $g$ formed of a part fixed to the wooden felly and a removable part secured by clamps $h$. Any well known or approved form of detachable rim may be used in place of or in conjunction with the rim $b$.

Having thus described the nature of my said invention and the best means I know of carrying the same into practical effect, I claim:

In combination, a vehicle wheel, a rim of larger diameter than the latter, a multiple pneumatic tire on said rim, and an inner pneumatic tire between said rim and the wheel.

In testimony that I claim the foregoing as my invention, I have signed my name in presence of two witnesses, this thirty first day of December 1908.

EDOUARD ETIENNE MICHELIN.

Witnesses:
     LOUIS CHARLET,
     JOSEPH VAN DAM.